(12) United States Patent
Ayirala et al.

(10) Patent No.: US 11,066,910 B2
(45) Date of Patent: Jul. 20, 2021

(54) ALKALINE WATER FLOODING PROCESSES FOR ENHANCED OIL RECOVERY IN CARBONATES

(71) Applicant: SAUDI ARABIAN OIL COMPANY, Dhahran (SA)

(72) Inventors: Subhash Ayirala, Dhahran (SA); Sultan Alenezi, Dammam (SA); Muhannad Alabdullateef, Al Khubar (SA); Salah Seleh, Dhahran (SA); Waleed Mohammed Alhodythi, Dhahran (SA); Ali Al-Yousef, Dhahran (SA)

(73) Assignee: SAUDI ARABIAN OIL COMPANY

( * ) Notice: Subject to any disclaimer, the term of this patent is extended or adjusted under 35 U.S.C. 154(b) by 15 days.

(21) Appl. No.: 16/554,181

(22) Filed: Aug. 28, 2019

(65) Prior Publication Data

US 2021/0062629 A1  Mar. 4, 2021

(51) Int. Cl.
*E21B 43/16* (2006.01)
*C09K 8/58* (2006.01)
(Continued)

(52) U.S. Cl.
CPC .............. *E21B 43/162* (2013.01); *C09K 8/58* (2013.01); *E21B 43/20* (2013.01)

(58) Field of Classification Search
CPC .......... C09K 8/58; C09K 8/584; C09K 8/528; C09K 8/594; E21B 43/20; E21B 43/16; E21B 37/00; E21B 21/00
See application file for complete search history.

(56) References Cited

U.S. PATENT DOCUMENTS 3,804,170 A  4/1974  Krehbiel et al.
3,977,470 A  8/1976  Chang
(Continued)

FOREIGN PATENT DOCUMENTS

WO   2013066552 A2   5/2013
WO   2017127522 A1   7/2017

OTHER PUBLICATIONS

Fathi et al., "Water-Based Enhanced Oil Recovery (EOR) by "Smart Water": Optimal Ionic Compostition for EOR in Carbonates", Energy & Fuels, 2011, pp. 5173-5179, American Chemical Society.
(Continued)

*Primary Examiner* — Zakiya W Bates
(74) *Attorney, Agent, or Firm* — Bracewell LLP; Constance Gall Rhebergen

(57) ABSTRACT

A method for extracting hydrocarbons from a carbonate reservoir in a formation, the method includes: injecting an aqueous conditioning slug having a primary reducing agent into the carbonate reservoir; injecting an aqueous main slug having an alkalinity agent and a secondary reducing agent into the carbonate reservoir to treat the carbonate reservoir and surface of the formation to reduce interfacial tension and alter wettability of the surface of the formation towards water-wet; injecting an aqueous buffering slug into the carbonate reservoir, the aqueous buffering slug having a tertiary reducing agent to treat the carbonate reservoir and surface of the formation to maintain altered wettability; wherein the primary reducing agent, secondary reducing agent, and tertiary reducing agent are inorganic sodium salts selected from the group consisting of: sodium sulfate, trisodium phosphate, sodium tetraborate, sodium iodide, and combinations of the same; and injecting a displacing fluid to drive the hydrocarbons in the carbonate reservoir toward an extraction well.

20 Claims, 3 Drawing Sheets

(51) Int. Cl.
*E21B 43/20* (2006.01)
*E21B 43/22* (2006.01)

(56) References Cited

U.S. PATENT DOCUMENTS

| | | |
|---|---|---|
| 4,004,638 A | 1/1977 | Burdyn et al. |
| 4,643,253 A | 2/1987 | Shepard, Jr. et al. |
| 4,660,641 A | 4/1987 | Shen |
| 4,892,146 A | 1/1990 | Shen |
| 2016/0272873 A1 | 9/2016 | Mahadevan et al. |
| 2018/0148633 A1* | 5/2018 | Ayirala ............... C02F 1/441 |
| 2018/0305604 A1 | 10/2018 | Breedlove et al. |
| 2019/0233712 A1 | 8/2019 | Fathi Najafabadi et al. |

OTHER PUBLICATIONS

Tagavifar et al., "Alkaline I Surfactant I Polymer Flooding With Sodium Hydroxide in Indiana Limestone: Analysis of Water / Rock Interactions and Surfactant Adsoprtion", Society of Petroleum Engineers, 2018, pp. 23, SPE.
Yousef et al., "Laboratory Investigation of the Impact of Injection-Water Salinity and Ionic Content on Oil Recovery From Carbonate Reservoirs", Reservoir Evaluation & Enginerring, 2011, pp. 578-593, Society of Petroleum Engineers.
(SA51096) International Search Report and Written Opinion of PCT Application No. PCT/US2020/048535 dated Dec. 3, 2020: pp. 1-13.

* cited by examiner

ALKALINE WATER FLOODING PROCESSES FOR ENHANCED OIL RECOVERY IN CARBONATES

FIELD

This disclosure generally relates to enhanced recovery of fluids from a reservoir in a subterranean formation, and more particularly systems and methods for altering wettability of formation surfaces and reducing interfacial tension to recover hydrocarbons from a reservoir.

BACKGROUND

In primary oil recovery operations, which typically rely on natural forces present in a reservoir, it is usually only possible to recover a relatively minor percentage of hydrocarbons present in the reservoir. After primary oil recovery operations, enhanced oil recovery techniques can be used to increase the recovery of hydrocarbons from a reservoir. Enhanced oil recovery processes used in modern oil and gas operations may include chemical, gas, thermal, and microbial based processes.

Waterflooding has been widely used to maintain reservoir pressures and displace hydrocarbons toward extraction wells. Alkaline waterflooding, which has been used in enhanced recovery operations, involves injecting an aqueous solution containing an alkaline chemical with a surfactant to neutralize organic acids in the reservoir oil and produce corresponding salts. The alkalinity and monovalent salt salinity of the solution are controlled within specified ranges, which reduces the oil-water interfacial tension. Reduced oil-water interfacial tension facilitates displacement of oil from the interstices of the reservoir.

SUMMARY

A general object of this disclosure is to provide systems and methods for altering wettability and recovering hydrocarbons from a reservoir. The methods and systems disclosed here involve conditioning and treating a reservoir with aqueous solutions to shift wettability of the rock surface of the reservoir toward water-wet and to reduce interfacial tension. The reduction in interfacial tension and the shift toward water-wet surface conditions facilitates recovery of hydrocarbons from the interstices of the reservoir.

Embodiments disclosed here include systems and processes for recovering hydrocarbons from a reservoir in a subterranean formation. Certain embodiments include injecting an aqueous conditioning slug into the reservoir, the aqueous conditioning slug having a primary reducing agent; injecting an aqueous main slug having an alkalinity agent and a secondary reducing agent into the reservoir after the conditioning slug such that interfacial tension and wettability of rock surfaces of the reservoir are altered towards water-wet; injecting an aqueous buffering slug having a tertiary reducing agent into the reservoir after the main slug such that altered interfacial tension and wettability are maintained; and injecting a displacing fluid after the buffering slug to drive the hydrocarbons in the reservoir toward an extraction well.

In certain embodiments, the primary, secondary, and tertiary reducing agents can include an inorganic sodium salt independently selected from the group consisting of: sodium sulfate ($Na_2SO_4$), trisodium phosphate ($Na_3PO_4$), sodium tetraborate ($Na_2B_4O_7$), and sodium iodide (NaI), and combinations of the same. In some embodiments, the primary, secondary, and tertiary reducing agents can all include the same inorganic sodium salt. The alkalinity agent in the aqueous main slug can include sodium hydroxide, and the aqueous main slug can have a pH in the range of about 12.0-14.0. In some embodiments, the displacing fluid can include seawater.

In certain embodiments, the concentration of the primary reducing agent in the aqueous conditioning slug can be in the range of about 5,000-7,000 parts per million (ppm) total dissolved solids (TDS) on a mass basis. In certain embodiments, the concentration of the secondary reducing agent in the aqueous main slug can be in the range of about 5,000-7,000 ppm TDS. In certain embodiments, the concentration of the alkalinity agent in the aqueous main slug can be in the range of about 0.01-1.00 percent by weight (wt %). In certain embodiments, the concentration of the tertiary reducing agent in the aqueous buffering slug can be in the range of about 5,000-7,000 ppm TDS.

In certain embodiments, the volume of the aqueous conditioning slug can be in the range of about 0.1-0.2 pore volumes; the volume of the aqueous main slug can be in the range of about 0.3-0.6 pore volumes; the volume of the aqueous buffering slug can be in the range of about 0.1-0.2 pore volumes; and the volume of the displacing fluid can be in the range of about 0.5-1.0 pore volumes.

Embodiments of a system for extracting hydrocarbons from a reservoir are also disclosed. An embodiment of such a system includes an injection well that is in fluid communication with a reservoir and that is operable to inject a sequence of slugs into the reservoir, an extraction well in fluid communication with the reservoir, and an injector pump that has an inlet to receive a displacing fluid from a displacing fluid inlet stream and an outlet for injecting the displacing fluid into the injection well. In this embodiment, the reservoir has hydrocarbons and a sequence of slugs that include an aqueous conditioning slug having a primary reducing agent, an aqueous main slug having a secondary reducing agent, and an aqueous buffering slug having a tertiary reducing agent.

In certain embodiments, the primary, secondary, and tertiary reducing agents can include an inorganic sodium salt independently selected from the group consisting of: sodium sulfate, trisodium phosphate, sodium tetraborate, sodium iodide, and combinations of the same. In some embodiments, the primary, secondary, and tertiary reducing agents can all include the same inorganic sodium salt. The alkalinity agent in the aqueous main slug can include sodium hydroxide, and the aqueous main slug can have a pH in the range of about 12.0-14.0. In some embodiments, the displacing fluid can include seawater.

In certain embodiments, the concentration of the primary reducing agent in the aqueous conditioning slug can be in the range of about 5,000-7,000 ppm TDS. In certain embodiments, the concentration of the secondary reducing agent in the aqueous main slug can be in the range of about 5,000-7,000 ppm TDS. In certain embodiments, the concentration of the alkalinity agent in the aqueous main slug can be in the range of about 0.01-1.00 wt %. In certain embodiments, the concentration of the tertiary reducing agent in the aqueous buffering slug can be in the range of about 5,000-7,000 ppm TDS.

In certain embodiments, the volume of the aqueous conditioning slug can be in the range of about 0.1-0.2 pore volumes; the volume of the aqueous main slug can be in the range of about 0.3-0.6 pore volumes; the volume of the aqueous buffering slug can be in the range of about 0.1-0.2 pore volumes; and the volume of the displacing fluid can be in the range of about 0.5-1.0 pore volumes.

BRIEF DESCRIPTION OF THE DRAWINGS

The embodiments disclosed here will be understood by the following detailed description along with the accompanying drawings. The embodiments in the figures are given as examples; the disclosure is not limited to the content of the illustrations.

DETAILED DESCRIPTION

Figure 1:
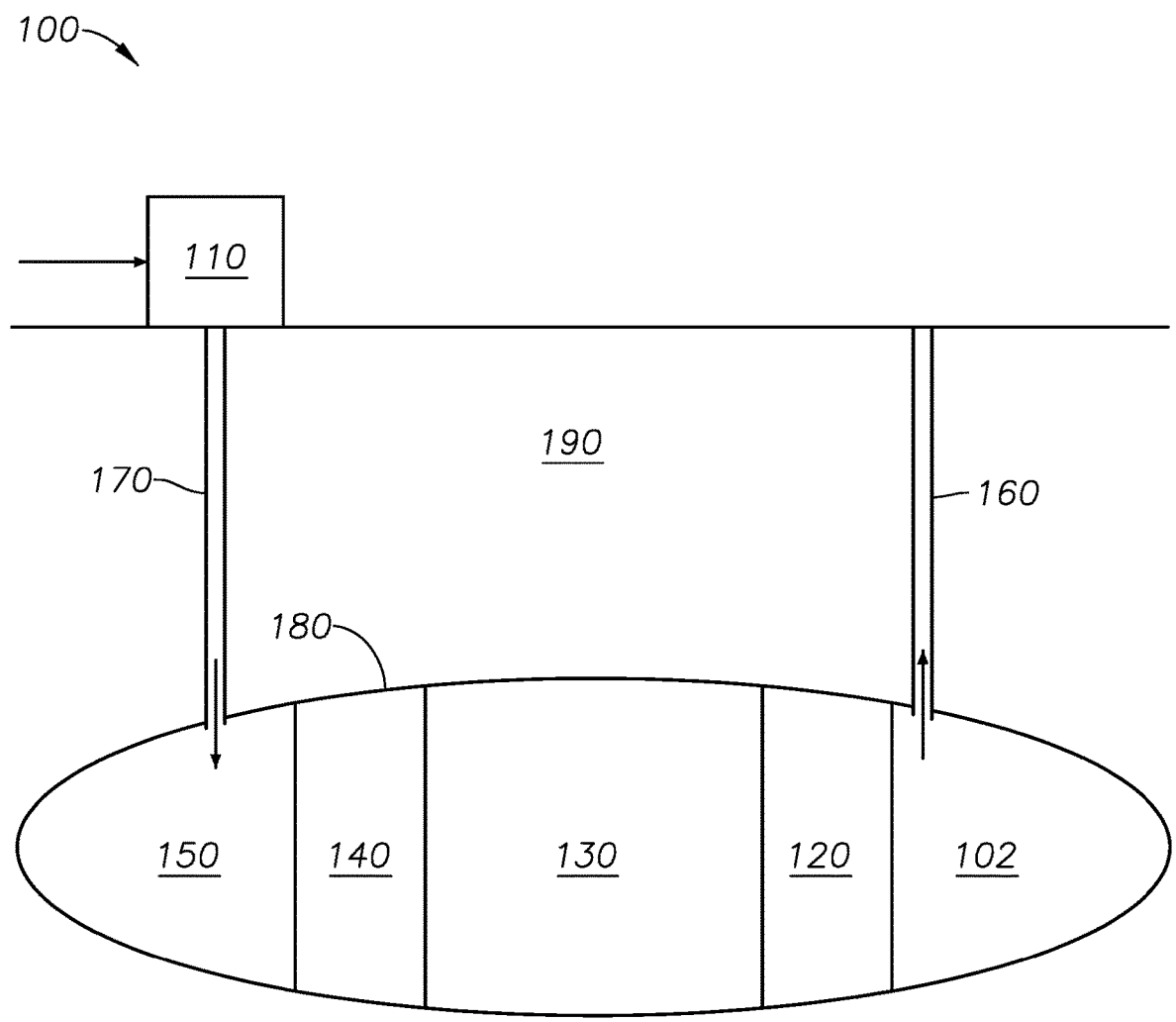
FIG. 1 is an illustration of a system and process for extracting hydrocarbons from a reservoir.

This disclosure describes various embodiments related to systems and methods for recovering hydrocarbons from a reservoir in a subterranean formation. For certain embodiments, many details are provided for thorough understanding of the various components or steps. In other instances, well-known processes, devices, compositions, and systems are not described in particular detail so that the embodiments are not obscured by detail. Likewise, illustrations of the various embodiments can omit certain features or details so that various embodiments are not obscured.

The drawings provide an illustration of certain embodiments. Other embodiments can be used, and logical changes can be made without departing from the scope of this disclosure. The following detailed description and the embodiments it describes are not to be taken in a limiting sense. This disclosure is intended to disclose certain embodiments with the understanding that many other undisclosed changes and modifications can fall within the spirit and scope of the disclosure. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

The description can use the phrases "in some embodiments," "in various embodiments," "in an embodiment," or "in embodiments," which can each refer to one or more of the same or different embodiments. Furthermore, the terms "comprising," "including," "having," and the like, as used with respect to embodiments of the present disclosure, are synonymous.

Unless otherwise indicated, all numbers expressing quantities, percentages or proportions, and other numerical values used in the specification and claims should be understood as being modified by the term "about." The term "about" applies to all numeric values, whether or not explicitly indicated. "About" generally modifies the recited term to include a deviation up to and including ±5% of the recited value unless the deviation alters the function or result of the recited value.

Ranges can be expressed in this disclosure as from about one particular value and to about another particular value. With these ranges, another embodiment is from the one particular value to the other particular value, along with all combinations within the range. When the range of values is described or referenced in this disclosure, the interval encompasses each intervening value between the upper limit and the lower limit as well as the upper limit and the lower limit and includes smaller ranges of the interval subject to any specific exclusion provided.

Unless otherwise defined, all technical and scientific terms used in this specification and the appended claims have the same meanings as commonly understood by one of ordinary skill in the relevant art.

Where a method includes two or more defined steps in this disclosure or the appended claims, the defined steps can be carried out in any order or simultaneously except where the context excludes that possibility.

Ionic concentrations are given in parts per million on a mass basis throughout this disclosure unless otherwise specified.

"Reducing agent" refers to an inorganic salt that when hydrolyzed dissociates completely to yield one or more monovalent cations and a mono-, di-, or trivalent anion, and that is capable of altering the wettability of a carbonate surface toward more water-wet. Examples of reducing agents include sodium sulfate, trisodium phosphate, sodium tetraborate, sodium iodide, and combinations of the same.

"Alkalinity agent" refers to a water-soluble basic salt that forms hydroxide ions or the solution of a base when dissolved in water. Examples of alkalinity agents include sodium hydroxide (NaOH), potassium hydroxide (KOH), calcium hydroxide ($Ca(OH)_2$), ammonia ($NH_3$), and combinations of the same.

"Slug" refers to a finite volume of fluid having a mostly uniform composition, and that can be injected into a reservoir. Slug size is given as a proportion of slug volume to pore volume.

"Pore volume" refers to a unit of measure for the void space available in the in situ rock of the reservoir between the injection well and the production well.

"Displacing fluid" refers to a dense fluid that can be injected into a reservoir to drive hydrocarbons and any preceding injection slugs toward an extraction well.

"Reservoir" refers to a subterranean body of rock having sufficient porosity and permeability to store and transmit fluids. Though not necessary, the reservoir can have fractures which facilitate fluid flow. In some embodiments, the reservoir is a carbonate reservoir. Carbonate reservoirs typically have rock surfaces that tend to be positively-charged, making them oil-wet. The reservoir can have a network or collection of fluid held in pores, pockets, capillaries, interstices, fractures, or crevices of a formation. The reservoir can hold hydrocarbons such as oil or gas.

The pores, pockets, capillaries, interstices, fractures, or crevices of the reservoir have surfaces that are in contact with fluids. The surfaces in contact with fluids in the reservoir have a present state of wettability. Wettability is the affinity of a fluid to a solid surface and can be inferred by the contact angle that the fluid, spreading and adhering to the solid surface, makes with the solid surface at the presence of another immiscible fluid. Wettability can include oil-wet, water-wet, and mixed-wet.

Water-wet surfaces are surfaces that have a water wettability in the presence of oil with an oil contact angle (measured inside the oil phase) ranging between 120 degrees and 180 degrees. Oil-wet surfaces are surfaces that have oil wettability, that is, the oil-wet surfaces are surfaces where oil spreads out along the surface or beads up on the surface. Without being bound to any particular technical theory, it is believed that most carbonate reservoirs are mixed wet (that is, mixed oil- and water-wet) or oil-wet conditions.

The aqueous conditioning slug is a slug of an aqueous saline solution having a primary reducing agent. The aqueous conditioning slug is useful for displacing or sweeping divalent cations present in the reservoir and partially shifting the wettability of rock surfaces toward water-wet. Anions from the primary reducing agent can adsorb onto the rock surface of the reservoir shifting the wettability of the surface toward water-wet. Injection water having a primary reducing agent can also flush divalent cations present in the reservoir. If present, divalent cations in the reservoir can interfere with beneficial reactions involving alkali. By conditioning the reservoir with an aqueous conditioning slug having a primary reducing agent, the interaction of alkali with divalent cations in subsequent treatments can be significantly reduced.

In some embodiments, the aqueous conditioning slug has a volume in the range of about 0.1-0.2 pore volumes. The small size of the aqueous conditioning slug reduces costs associated with pumping larger preflush volumes, but is still effective to displace divalent cation-bearing formation water. The aqueous conditioning slug can have a concentration of the primary reducing agent in the range of about 5,600-7,000 ppm in some embodiments, and in some embodiments the concentration of the primary reducing agent in the aqueous conditioning slug can be in the range of 5,000-7,000 ppm TDS. The aqueous conditioning slug effectively displaces cations from brines present in the reservoir. Solutions having a concentration of the primary reducing agent that is less than about 5,000 ppm TDS are unsuitable because they lack sufficient salinity and concentration of anions from the primary reducing agent to appreciably alter the wettability of the carbonate surface. In the aqueous conditioning slug, a concentration of anions from the primary reducing agent in the range of about 3,000-5,000 ppm is suitable to alter the wettability of the carbonate surface.

The aqueous main slug is a slug of an aqueous saline solution having a secondary reducing agent and an alkalinity agent. The aqueous main slug can have an alkalinity agent concentration in the range of about 0.01-1.00 wt %, and secondary reducing agent concentration in the range of about 5,000-7,000 ppm TDS. In some embodiments, the concentration of the secondary reducing agent is in the range of about 5,600-7,000 ppm. Solutions having a secondary reducing agent concentration less than about 5,000 ppm are unsuitable because they lack sufficient salinity and concentration of anions from the secondary reducing agent to appreciably alter the wettability of the carbonate surface. In the aqueous main slug, a concentration of anions from the secondary reducing agent in the range of about 3,000-5,000 ppm is suitable to alter the wettability of the carbonate surface. The volume of the aqueous main slug can be in the range of about 0.3-0.6 pore volumes. The size of the aqueous main slug is suitably large to provide sufficient opportunity for alkali and ions from the secondary reducing agent to interact with the carbonate surface and favorably alter wettability. The aqueous main slug can have a pH in the range of about 12.0-14.0. In some embodiments, other chemicals such as surfactant can be added to the aqueous main slug to further enhance its effectiveness.

The effect of the secondary reducing agent and alkalinity agent in the aqueous main slug is to increase pH in the reservoir, reduce interfacial tension, and alter wettability of the rock surface of the reservoir from oil-wet to more water-wet. By way of example and not intending to be bound by any particular technical theory, the alkalinity agent can react with carboxylic acid groups present in the reservoir to create natural surfactants in situ. In some embodiments, interfacial tension can be reduced by as much as about 50% when compared with the interfacial tension between high-salinity seawater and oil. In the aqueous main slug, the secondary reducing agent and alkalinity interact and cooperate to have the combined effect of efficiently releasing and mobilizing significant amounts of hydrocarbons from capillaries and interstices in the reservoir.

The aqueous buffering slug is a slug of a saline solution having a tertiary reducing agent. In some embodiments, the concentration of the tertiary reducing agent in the aqueous buffering slug can be in the range of about 5,000-7,000 ppm TDS. Solutions having less than 5,000 ppm TDS of the tertiary reducing agent are unsuitable because they lack sufficient salinity and concentration of anions to appreciably alter the wettability of the carbonate surface. In the aqueous buffering slug, a concentration of anions from the tertiary reducing agent in the range of about 3,000-5,000 ppm is suitable to alter the wettability of the carbonate surface. In some embodiments, the volume of the aqueous buffering slug can be in the range of about 0.1-0.2 pore volumes. The small size of the aqueous buffering slug reduces costs associated with pumping larger buffering volumes, but is still effective to prevent mixing at the trailing edge of the aqueous main slug with the subsequent displacing fluid. The aqueous buffering slug can also have the effect of maintaining the altered surface wettability of the reservoir as hydrocarbons are driven toward an extraction well. In some embodiments, the aqueous buffering slug can include a polymer for additional mobility control of the aqueous main slug.

In certain embodiments, the primary reducing agent, secondary reducing agent, and tertiary reducing agent can each have the same composition; and in some embodiments different combinations of reducing agents can be used. By way of example and not limitation, the primary, secondary, and tertiary reducing agents can each be sodium sulfate. In another example, the primary reducing agent can be trisodium phosphate while the secondary reducing agent and tertiary reducing agent can be sodium sulfate. The primary reducing agent, secondary reducing agent, and tertiary reducing agent can each be selected independently from the group that includes sodium sulfate, trisodium phosphate, sodium tetraborate, sodium iodide, and combinations of the same.

In the step of injecting a displacing fluid, a displacing fluid is injected into the reservoir to drive hydrocarbons toward an extraction well. Typically, the displacing fluid will be an aqueous liquid. In some embodiments, the displacing fluid can be an aqueous saline solution having a salt concentration in the range of about 35,000-60,000 ppm. In some embodiments, the displacing fluid can be seawater.

In some embodiments, a sequence of slugs that includes the aqueous conditioning slug, aqueous main slug, and aqueous buffering slug as they have been described in this disclosure can be provided in the reservoir. The slugs are distributed between the injection well and the extraction well. In order of increasing proximity to the injection well, the sequence of slugs includes the aqueous conditioning slug, aqueous main slug, and aqueous buffering slug.

FIG. 1 shows an illustration of a process and system 100 for extracting hydrocarbons from a reservoir 180 in a formation 190. In FIG. 1, an injector pump 110 is provided that is operable to inject an aqueous conditioning slug, an aqueous main slug, an aqueous buffering slug, and a displacing fluid through an injection well 170 into the reservoir 180. The injector pump 110 injects an aqueous conditioning slug 120 having a primary reducing agent, an aqueous main slug 130 having a secondary reducing agent and an alkalinity agent, an aqueous buffering slug 140 having a tertiary reducing agent, and a displacing fluid 150 into the reservoir 180 through an injection well 170 to drive mobilized hydrocarbons 102 toward an extraction well 160. The steps described in the preceding process description are also applicable to the process shown in FIG. 1.

EXAMPLES

The following illustrative examples are intended to be non-limiting. The examples involve three solutions useful or illustrative of the state of the art: seawater (state of the art), sodium sulfate in water, and sodium sulfate and sodium hydroxide in water. The compositions of the three solutions are shown in Table 1.

TABLE 1

Compositions of three solutions used in the examples.
The solutions include seawater, sodium sulfate in water,
and sodium sulfate and sodium hydroxide in water.

| Components* | Seawater | Sodium sulfate in water | Sodium sulfate and sodium hydroxide in water |
|---|---|---|---|
| Sodium chloride (NaCl)* | 41.04 | — | — |
| Calcium chloride (CaCl$_2$ 2H$_2$O)* | 2.314 | — | — |
| Magnesium chloride (MgCl$_2$ 6H$_2$O)* | 17.645 | — | — |
| Sodium bicarbonate (NaHCO$_3$)* | 0.165 | — | — |
| Sodium sulfate (Na$_2$SO$_4$)* | 6.314 | 5.761 | 5.761 |
| Sodium hydroxide (NaOH)* | — | — | 1.0 |
| Total dissolved solids (ppm) | 57,610 | 5,761 | 5,761 |

*concentrations of components are given in grams per liter

Example 1

The pH values of the three solutions shown in Table 1 were measured and evaluated. The measured values were 8.0 for seawater, 6.4 for sodium sulfate in water, and 12.1 for sodium sulfate and sodium hydroxide in water. Notably, the pH of the solution containing sodium sulfate and sodium hydroxide in water was about six units greater than the pH of sodium sulfate in water without sodium hydroxide. The basic pH of the sodium sulfate and sodium hydroxide in water is conducive to the reactions that result in reduced interfacial tension and altered wettability of rock surfaces toward water-wet.

Example 2

Figure 2:
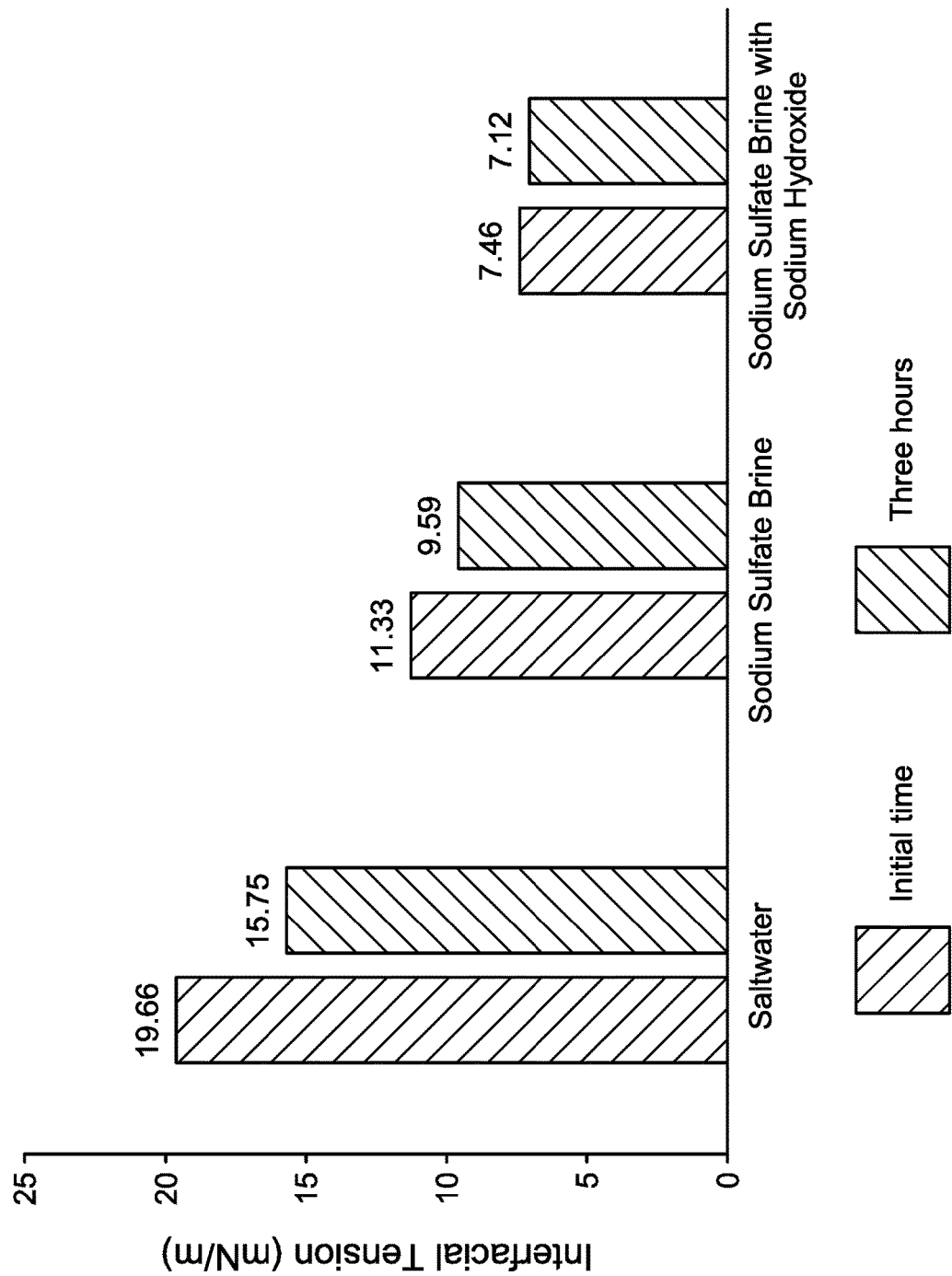
FIG. 2 is a chart showing interfacial tension data involving solutions useful to the invention or illustrative of the state of the art.

The three solutions shown in Table 1 were analyzed to determine the interfacial tension between each of the solutions and oil, and the results are shown in FIG. 2. The interfacial tension was measured using a pendent drop tensiometer. Because interfacial tension changes dynamically with time, the interfacial tension of the three solutions was determined from an initial value (zero time) until it reached equilibrium after about three hours. As shown in FIG. 2, the initial interfacial tension of the saltwater, sodium sulfate, and sodium sulfate with sodium hydroxide solutions were 19.7, 11.3, and 7.5 millinewtons per meter (mN/m) respectively; and at equilibrium, 15.7, 9.6, and 7.1 mN/m respectively. FIG. 2 shows a significant reduction in interfacial tension for both the solution containing sodium sulfate in water and the solution containing sodium sulfate with sodium hydroxide in water. The interfacial tension of the solution containing sodium sulfate and sodium hydroxide in water after three hours was about 25% less than sodium sulfate in water, and 54% less than seawater. The reduction in interfacial tension favors mobilizing hydrocarbons in the reservoir and facilitating their recovery. These results show that sodium sulfate and sodium hydroxide interact and cooperate to have the combined effect of reducing interfacial tension between oil and water.

Example 3

Figure 3:
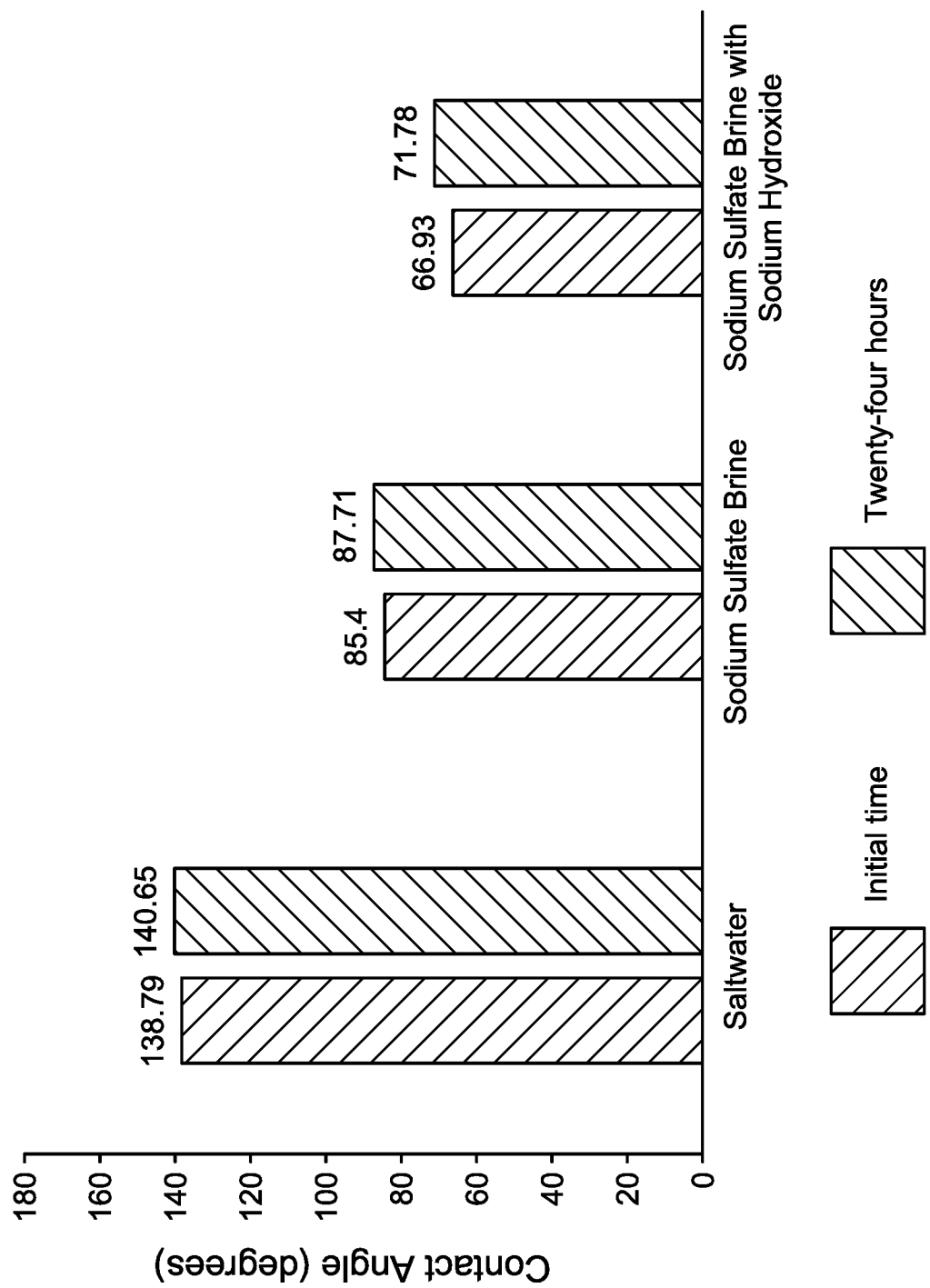
FIG. 3 is a chart showing contact angle data involving solutions useful to the invention or illustrative of the state of the art.

Contact angle measurements were taken of captive oil drops on a flat carbonate surface in the three solutions shown in Table 1. Contact angle measurements were performed on a crude oil aged carbonate chip inside of an optical cell under reservoir conditions. The cell was filled with solution and an oil droplet was attached to the chip. Photographs were taken of the captive drop over time, and the contact angle between the edge of the oil drop and the chip surface in the aqueous phase was measured at different time intervals. The results of the contact angle measurements are shown in FIG. 3. As it relates to wettability, a lesser contact angle is considered more water-wet than a greater contact angle. An oil droplet with a low contact angle is more likely to escape the carbonate surface, resulting in higher oil recovery. The contact angle of oil in a water-wet solution is typically in the range of about 0°-75°, and the contact angle of oil in an oil-wet solution is typically in the range of about 105°-180°. As shown in FIG. 3, the contact angle of oil in seawater was determined to be in the range of about 139°-141°, which can be classified as oil-wet. The contact angle of oil in a solution containing sodium sulfate in water was in the range of about 85°-88°, which indicates intermediate wettability. The contact angle of oil in a solution containing sodium sulfate and sodium hydroxide in water was in the range of about 67°-72°, which can be classified as water-wet. The results of the contact angle measurements show that sodium sulfate and sodium hydroxide interact and cooperate to have the combined effect of altering the wettability of the carbonate surface toward more water-wet.

Example 4

An example of a system and process as shown in FIG. 1 is provided here. In this example, a carbonate reservoir 180 is provided in a formation 190 containing hydrocarbons. The carbonate reservoir 180 is first treated with an aqueous conditioning slug 120 having a primary reducing agent, sodium sulfate, with the same composition as the solution containing sodium sulfate in water shown in Table 1, and the same properties for that solution as discussed in Examples 1-3. A volume of the aqueous conditioning slug in the range of 0.1-0.2 pore volumes is injected by an injector pump 110 through the injection well 170 into the carbonate reservoir 180. The aqueous conditioning slug 130 conditions the carbonate reservoir 180 by flushing the divalent cations present in the carbonate reservoir 180 and partially altering the wettability of the rock surface of the carbonate reservoir 180 toward more water-wet.

The carbonate reservoir 180 is then treated with an aqueous main slug 130 having a secondary reducing agent and an alkalinity agent, sodium sulfate and sodium hydroxide respectively. The aqueous main slug 130 is injected into the carbonate reservoir 180 by the injector pump 110 following the injection of the aqueous conditioning slug 120, and has a volume in the range of 0.3-0.6 pore volumes and the same composition and properties as the solution containing sodium sulfate and sodium hydroxide in water shown in Table 1 and discussed in Examples 1-3. The chemicals in the aqueous main slug 130 react with carboxylic acid groups present in the carbonate reservoir to create natural surfactants in situ, and react with the rock surface of the carbonate reservoir 180 to alter the wettability of the rock surface of the carbonate reservoir 180 toward more water-wet. The combined effect of the reactions is to release oil from the capillaries and interstices of the carbonate reservoir 180 and mobilize it for extraction.

After the aqueous main slug 130 is injected, an aqueous buffering slug 140 is injected into the carbonate reservoir 180 by the injector pump 110 with a volume in the range of 0.1-0.2 pore volumes. The aqueous buffering slug 140 comprises a tertiary reducing agent, sodium sulfate, with the same composition as the solution containing sodium sulfate in water shown in Table 1, and the same properties for that solution as discussed in Examples 1-3. The aqueous buffering slug 140 maintains the altered wettability of the surface of the formation 130 and prevents chemicals in the aqueous main slug 130 from mixing with the displacing fluid 150.

Following injection of the aqueous buffering slug 140, a displacing fluid, seawater, is injected by the injector pump 110 with a volume in the range of 0.5-1.0 pore volumes. The seawater has the same composition and properties as shown in Table 1 and discussed in Examples 1-3. The displacing fluid drives mobilized oil 102 in the carbonate reservoir 180 toward an extraction well 160 where it is extracted.

We claim:

1. A method for extracting hydrocarbons from a carbonate reservoir in a subterranean formation, the method comprising:
    injecting an aqueous conditioning slug into the carbonate reservoir, the aqueous conditioning slug comprising a primary reducing agent;
    following the step of injecting the aqueous conditioning slug into the carbonate reservoir, injecting an aqueous main slug comprising an alkalinity agent and a secondary reducing agent into the carbonate reservoir such that interfacial tension and wettability of a rock surface of the carbonate reservoir are altered towards water-wet, wherein the main slug has a concentration of the secondary reducing agent that is greater than 5,000 parts per million (ppm) total dissolved solids (TDS) up to 7,000 ppm TDS;
    following the step of injecting the aqueous main slug into the carbonate reservoir, injecting an aqueous buffering slug comprising a tertiary reducing agent into the carbonate reservoir such that altered interfacial tension and wettability are maintained; and
    following the step of injecting the aqueous buffering slug, injecting a displacing fluid to drive the hydrocarbons in the carbonate reservoir toward an extraction well.

2. The method of claim 1, wherein the primary reducing agent comprises an inorganic sodium salt selected from the group consisting of: sodium sulfate, trisodium phosphate, sodium tetraborate, sodium iodide, and combinations of the same; wherein the secondary reducing agent comprises an inorganic sodium salt selected from the group consisting of: sodium sulfate, trisodium phosphate, sodium tetraborate, sodium iodide, and combinations of the same; and wherein the tertiary reducing agent comprises an inorganic sodium salt selected from the group consisting of sodium sulfate, trisodium phosphate, sodium tetraborate, sodium iodide, and combinations of the same.

3. The method of claim 1, wherein the primary reducing agent in the aqueous conditioning slug has a concentration in the range of 5,000-7,000 ppm TDS.

4. The method of claim 1, wherein the tertiary reducing agent in the aqueous buffering slug has a concentration in the range of 5,000-7,000 ppm TDS.

5. The method of claim 1, wherein the alkalinity agent in the aqueous main slug has a concentration in the range of 0.01 wt % to 1.00 wt %.

6. The method of claim 1, wherein the step of injecting the aqueous conditioning slug into the carbonate reservoir includes injecting the aqueous conditioning slug with a volume in the range of 0.1-0.2 pore volumes.

7. The method of claim 1, wherein the step of injecting the aqueous main slug into the carbonate reservoir includes injecting the aqueous main slug with a volume in the range of 0.3-0.6 pore volumes.

8. The method of claim 1, wherein the step of injecting the aqueous buffering slug into the carbonate reservoir includes injecting the aqueous buffering slug with a volume in the range of 0.1-0.2 pore volumes.

9. The method of claim 1, wherein the step of injecting the displacing fluid includes injecting the displacing fluid with a volume in the range of 0.5-1.0 pore volumes.

10. The method of claim 1, wherein the primary reducing agent, secondary reducing agent, and the tertiary reducing agent are sodium sulfate.

11. The method of claim 1, wherein the alkalinity agent is sodium hydroxide.

12. The method of claim 1, wherein the displacing fluid is seawater.

13. The method of claim 1, wherein the pH of the aqueous main slug is in the range of 12.0-14.0.

14. A system for extracting hydrocarbons from a carbonate reservoir in a subterranean formation, the system comprising:
    an injection well operable to inject a sequence of slugs into the carbonate reservoir, and an extraction well operable to extract hydrocarbons from the carbonate reservoir; the injection well in fluid communication with the carbonate reservoir, and the carbonate reservoir in fluid communication with the extraction well; the carbonate reservoir comprising hydrocarbons and having a sequence of slugs, the sequence of slugs comprising an aqueous conditioning slug comprising a primary reducing agent, an aqueous main slug comprising a secondary reducing agent and an alkalinity agent, wherein the main slug has a concentration of the secondary reducing agent that is greater than 5,000 parts per million (ppm) total dissolved solids (TDS) up to 7,000 ppm TDS, and an aqueous buffering slug comprising a tertiary reducing agent; and
    an injector pump having a displacing fluid inlet for receiving a displacing fluid from a displacing fluid inlet stream, and a displacing fluid outlet for injecting the displacing fluid into the injection well.

15. The system of claim 14, wherein the primary reducing agent comprises an inorganic sodium salt selected from the group consisting of: sodium sulfate, trisodium phosphate, sodium tetraborate, sodium iodide, and combinations of the same;
    wherein the secondary reducing agent comprises an inorganic sodium salt selected from the group consisting of: sodium sulfate, trisodium phosphate, sodium tetraborate, sodium iodide, and combinations of the same; and
    wherein the tertiary reducing agent comprises an inorganic sodium salt selected from the group consisting of sodium sulfate, trisodium phosphate, sodium tetraborate, sodium iodide, and combinations of the same.

16. The system of claim 14, wherein the primary reducing agent in the aqueous conditioning slug has a concentration in the range of 5,000-7,000 ppm TDS.

17. The system of claim 14, wherein the tertiary reducing agent in the aqueous buffering slug has a concentration in the range of 5,000-7,000 ppm TDS.

18. The system of claim 14, wherein the alkalinity agent in the aqueous main slug has a concentration in the range of 0.01 wt % to 1.00 wt %.

19. The system of claim 14, wherein the primary reducing agent, secondary reducing agent, and tertiary reducing agent are sodium sulfate.

20. The system of claim 14, wherein the alkalinity agent is sodium hydroxide.

\* \* \* \* \*